United States Patent
Eriksson

(10) Patent No.: US 8,774,189 B2
(45) Date of Patent: Jul. 8, 2014

(54) POLICY ROUTING IN A COMMUNICATIONS NETWORK

(75) Inventor: Anders E. Eriksson, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 935 days.

(21) Appl. No.: 12/678,905

(22) PCT Filed: Sep. 20, 2007

(86) PCT No.: PCT/EP2007/059997
§ 371 (c)(1),
(2), (4) Date: May 28, 2010

(87) PCT Pub. No.: WO2009/036804
PCT Pub. Date: Mar. 26, 2009

(65) Prior Publication Data
US 2011/0058545 A1  Mar. 10, 2011

(51) Int. Cl.
*H04L 12/28* (2006.01)

(52) U.S. Cl.
USPC ............ 370/393; 370/396; 709/223; 709/238

(58) Field of Classification Search
None
See application file for complete search history.

(56) References Cited

U.S. PATENT DOCUMENTS

| | | | | |
|---|---|---|---|---|
| 5,408,465 | A * | 4/1995 | Gusella et al. | 370/231 |
| 6,047,332 | A * | 4/2000 | Viswanathan et al. | 709/245 |
| 6,813,272 | B1 | 11/2004 | An et al. | |
| 2002/0071390 | A1 * | 6/2002 | Reeves et al. | 370/235 |
| 2002/0178246 | A1 * | 11/2002 | Mayer | 709/223 |
| 2004/0184483 | A1 * | 9/2004 | Okamura et al. | 370/477 |
| 2005/0149627 | A1 * | 7/2005 | Schreter | 709/223 |
| 2006/0130064 | A1 * | 6/2006 | Srivastava | 718/102 |
| 2006/0159095 | A1 * | 7/2006 | Cook et al. | 370/392 |
| 2006/0209823 | A1 * | 9/2006 | Wan | 370/389 |
| 2007/0297396 | A1 * | 12/2007 | Eldar et al. | 370/356 |
| 2007/0297402 | A1 * | 12/2007 | Koehler | 370/389 |
| 2008/0049621 | A1 * | 2/2008 | McGuire et al. | 370/236.2 |
| 2008/0056207 | A1 * | 3/2008 | Eriksson et al. | 370/338 |
| 2010/0167734 | A1 * | 7/2010 | Jones et al. | 455/435.1 |

FOREIGN PATENT DOCUMENTS

WO  2008028890 A1  3/2008

OTHER PUBLICATIONS

Dafni, Gad J., "Generating Unique Identifiers in a Distributed System," Dept. of Computer Science, University of Texas at Austin (Apr. 1985).*
EP Office Action issued on Nov. 18, 2010 in Application No. 07 820 430.2, 6 pages.

* cited by examiner

*Primary Examiner* — Ian N Moore
*Assistant Examiner* — Eric P Smith
(74) *Attorney, Agent, or Firm* — Rothwell, Figg, Ernst & Manbeck, P.C.

(57) ABSTRACT

A method of constructing a globally unique locator for a network entity attached to a network. A path between a core network and the network entity via intermediate network entities is determined by applying policy routing. The globally unique locator for the network entity is constructed by concatenating elements identifying the locations of the network entity, the intermediate network entities and a node in the core network. The identifying elements are obtained from Attachment Registers associated with each of the network entity, the intermediate network entities and the node in the core network.

20 Claims, 8 Drawing Sheets

POLICY ROUTING IN A COMMUNICATIONS NETWORK

CROSS-REFERENCE TO RELATED APPLICATION

This application is a 35 U.S.C. §371 National Phase Application from PCT/EP2007/059997, filed Sep. 20, 2007, and designating the United States.

TECHNICAL FIELD

The present invention relates to packet communications in data networks, and more particularly, to policy routing in a communications network.

BACKGROUND

Name-address management generally includes issues such as name-to-address resolution and name-address registration. Name-to-address resolution is a procedure by which a "name" of a network resource, e.g., a network node, is resolved or translated into a routable network address, i.e., a location in the network topology. Name-address registration is the corresponding registration procedure by which the name and the assigned network address of the resource are registered in the network. The name of the resource is normally known to users and typically also stays the same over relatively long periods of time.

Traditional networking architectures for the Public Switched Telephone Network (PSTN) or Internet solve the problem of connecting terminals or hosts (which can be considered as "boxes") in order to support a specific application such as telephony or WWW. To this end, traditional naming and addressing schemes employ host or network centric identities such as E.164 numbers for telephony, or Internet Protocol (IP) addresses and Uniform Resource Locators (URLs) for the Internet. However, the end user is typically interested in reaching a destination object that sits behind or within the box, such as a human being or a file, rather than communicating with the box itself. As the destination objects move to new boxes, box or network dependent identities of these objects must be updated. For example, it is an everyday experience that a person cannot be reached at the phone number registered in some semi-static directory because that directory does not track the phone that she is momentarily close to. Or a web link is broken because the target data object has been moved to another location. To address this class of problems, box-independent addressing schemes such as Telephone Number Mapping (ENUM), Session Initiation Protocol (SIP) names, and Uniform Resource Identifiers (URIs) have been developed. Using a presence or mobility mechanism, box-independent names of a destination object can then be mapped to the address of the box where the destination object is currently located. Likewise, inventory systems are used to track specific objects to a specific location.

In addition, it is quite common that mobile objects travel within or in association with other mobile objects. For example, a person may travel in association with a mobile phone that may be associated with a personal area network that may be associated with a vehicular network. Consider, for example, a person using a laptop with a Wireless Local Area Network (WLAN) who is working onboard a train that has Internet connectivity. To reach this person, three separate mobility-related functions must be used: 1) a presence function that binds the person to the laptop, 2) a mobility function that binds the laptop to a specific IP address on the train, and 3) a mobility function for the train.

Another example is a piece of merchandise that travels in a container that travels on a ship. For this case a separate inventory system would be used with little in common with the functions for personal and host mobility described in the previous example.

The Domain Name System (DNS) stores and provides information associated with domain names in a distributed database in networks such as the Internet. The DNS associates domain names with many types of information, but most importantly it provides the IP address for a given domain name. DNS makes it possible to associate easy-to-remember domain names (such as ericsson.com) with hard-to-remember IP addresses. DNS is suitable for resources that rarely change their location, but is not adapted for mobility. RFC 2136 describes "Dynamic Updates in the Domain Name System" in the hope of providing better support for rapid updates of DNS, but it is still far from being suitable for keeping track of roaming resources such as mobile phones and their users.

When routing protocols for the Internet and other fixed networks were initially created, hosts were not expected to move around. Therefore, hosts are usually named by their point of attachment to the network, e.g., IP addresses. Examples of such routing protocols include RIP, IS-IS, OSPF, BGP and PNNI. They are all well established technologies but have limited support for mobility and have convergence problems when network topologies change rapidly.

Traditionally, applications use IP-addresses in a way that does not allow them to change during an on-going session. To allow hosts to move without changing their IP-addresses (at least from an application perspective) mobility solutions in IP networks, such as Manet (ad hoc networks), Network Mobility (NEMO), and Mobile IP have been developed. But these are fairly complex solutions since they adapt a technology intended for fixed networks to new mobility requirements. In addition, there is a multitude of inventory systems for various classes of objects, such as library books or pieces of merchandise. Each system and mechanism is optimized for its specific class of objects. For example, mobile IP is optimized for mobility of IP boxes, SIP supports personal mobility, inventory systems handle mobility of goods, etc. Due to the diverse technologies employed in this field, it is hard to achieve synergies between the systems and mechanisms used for the different classes of mobile objects.

The Host Identity Protocol (HIP) provides a method of separating the end-point identifier and locator roles of IP addresses. It introduces a new Host Identity (HI) name space based on public keys. The public keys are typically self-generated. The HIP separation can be used to provide end-to-end connectivity over different locator domains. Even still, routing protocols under development cater to mobility of individual hosts (nodes) but do not adequately address the problems relating to mobile networks (MNs). A mobile network includes a group of many mobile hosts or other objects that move together as a group. Mobile network examples include networks located in any type of mobile vehicle, e.g., in a train, airplane, bus, ship, subway, etc., but are not limited to vehicles. All that is required is that the group of mobile objects, hosts and routers move substantially together at substantially the same time. Also, a communication satellite carrying a router is another example of a mobile network that dynamically attaches to ground stations, other communication satellites, and hosts or mobile phones. A particular mobility problem associated with mobile networks is a potentially huge number of registration or other location updates that need to be signalled and processed whenever the mobile network changes location. Such a move may cause an "update storm."

Consider for example a Public Land Mobile Network (PLMN) type of system like GSM and 3G cellular networks. Mobile host name resolution is handled via a Home Location Register (HLR) and the Visited Location Register (VLR). When a mobile host is called, a phone number (MS-ISDN) is resolved via the VLR and HLR into a corresponding E.164 address that allows the call to be routed to the mobile host, if the mobile host with the MS-ISDN has registered its current location area with the VLR. Local mechanisms are used to route the call to the specific cell in the location area in which the mobile host is currently located.

The HLR and VLR have overall good performance and security support regarding name resolution in cellular systems. But they are closely linked to the E.164 address structure and as such do not provide an open architecture for other and/or arbitrary name and address spaces. Moreover, this approach to registering a host with a centralized location register like the HLR/VLR does not function well with mobile networks. The problem is particularly acute when a large mobile network with many subnetworks or hosts roams and requires registration update signalling for every one of its subnetworks and/or hosts—a good example of an "update storm" mentioned above.

In dynamic DNS, when such a mobile network roams, each host in the mobile network must have its DNS record updated. For that situation, mobile IP requires that all home agents having hosts in the mobile network be updated. RFC 3963 describes the IETF Network Mobility (NEMO) basic support protocol which enables mobile networks to attach to different points in the Internet. The protocol is an extension of mobile IPv6 and allows session continuity for every node in the Mobile Network as the network moves. It also allows every node in the Mobile Network to be reachable while mobile around. But NEMO's distributed solution suffers from what is called "pinball routing," where all internetwork traffic must be routed between every mobility agent that has an associated mobile node or network in the path towards the destination host. As a result, tunnelling overhead accumulates per radio hop, and there are potential latency problems when several mobility agents are located at different continents, i.e., x-ogonal routing instead of triangular routing.

As illustrated in FIG. 1, it is known to provide a set of Attachment Registers 14 in a network 12, where the attachment registers perform one or more network functions. A primary function of the attachment registers is to store a locator point of an object reachable from a network. For example, Attachment Register A ($AR_A$) stores a locator point of network A 16. Information is stored in the attachment registers that establishes one or more logical links between attachment registers. In the example shown in FIG. 1, the arrows between the attachment registers 14 indicate that information stored in attachment register $AR_D$ links to attachment register $AR_C$. Similarly, information in $AR_C$ links to $AR_B$, and information in $AR_B$ links to $AR_A$. The information in these attachment registers creates a path to host D, and thus allows easy construction of a global locator to host D. By using attachment registers, a global locator can be constructed to a host attached to a network even where the network or an intermediate network changes location, without all hosts attached to the network having to change their address. So if, for example, Network C ($N_C$) changes it's location, $AR_C$ is updated with the new location of $N_C$. The AR for the other networks and network entities need not change.

The constructed locator consists of a list of nodes or links that describes a specific path between the Highest Level Network (or core network) and host D. In the general case when networks below the Highest Level Network are interconnected in an arbitrary topology, there are many possible paths between the Highest Level Network and host D. The locator construction procedure must therefore be guided by a routing protocol operating between the Attachment Registers that selects the most optimal path. Examples of policy routing include finding a path with a specific bandwidth, packet loss or delay capability, or finding a path that traverses at least one network with a specific functionality, such as transcoding. An additional example of policy routing is to find a path that traverses networks that belong to a specific operator.

SUMMARY

It is known to apply a policy routing mechanism between Attachment Registers based on link state routing. However, this requires a lot of network state and therefore consumes network resources. The inventor has devised a distance vector routing mechanism for signalling sent via networks and network entities that are identified using a globally unique locator derived from addresses held in Attachment Registers. This mechanism requires less network state than a link state routing mechanism, and is therefore more scalable than the link state approach.

In accordance with a first aspect of the present invention there is provided a method of constructing a globally unique locator for a network entity attached to a network. A path between a core network and the network entity via intermediate network entities is determined using policy routing. A locator for the network entity is then constructed by concatenating elements identifying the locations of the network entity, the intermediate network entities and a node in the core network. The locator effectively describes a path between the network entity and the core network. The elements are obtained from Attachment Registers associated with each of the network entity, the intermediate network entities and the node in the core network.

The path is optionally constructed from the network entity to the core network. In this case, the method comprises:
a) obtaining a locator of the network entity;
b) retrieving, from an Attachment Register associated with the network entity, information relating to intermediate network entities neighbouring the network entity, the information including locators for the neighbouring intermediate network entities;
c) determining, on the basis of the retrieved information and policy parameters retrieved from one of the Attachment Register and a central database, the neighbouring intermediate network entity next on a path between the network entity and the core network;
d) concatenating elements derived from the locator for the network entity with elements derived from the determined intermediate network entity to form a concatenated locator;
e) retrieving, from an Attachment Register associated with the determined intermediate network entity, information relating to further intermediate network entities neighbouring the determined intermediate network entity, the information including locators for the intermediate network entities neighbouring the determined intermediate network entity;
f) determining, on the basis of the retrieved information and policy parameters retrieved from one of the Attachment Register associated with the determined intermediate network entity and a central database, the neighbouring intermediate network entity next on a path between the source network entity and a core network;

g) concatenating elements derived from the locator of the next intermediate neighbouring network entity with the concatenated locator;

h) repeating, for the next intermediate neighbouring network entity, steps e) to g) unless the next network entity is a router disposed at the core network; and i) concatenating elements derived from a locator of the router with the concatenated locator to form a globally unique locator for the network entity.

Alternatively, the path is constructed from the core network to the network entity. In this case, the method comprises:

a) obtaining a locator of a router disposed at the core network;

b) retrieving, from an Attachment Register associated with router, information relating to intermediate network entities neighbouring the router, the information including locators for the neighbouring intermediate network entities;

c) determining, on the basis of the retrieved information and policy parameters retrieved from one of the Attachment Register and a central database, the neighbouring intermediate network entity next on a path between the router and the network entity;

d) concatenating elements derived from the locator for the router with elements derived from the determined intermediate network entity to form a concatenated locator;

e) retrieving, from an Attachment Register associated with the determined intermediate network entity, information relating to further intermediate network entities neighbouring the determined intermediate network entity, the information including locators for the intermediate network entities neighbouring the determined intermediate network entity;

f) determining, on the basis of the retrieved information and policy parameters retrieved from one of the Attachment Register associated with the determined intermediate network entity and a central database, the neighbouring intermediate network entity next on a path between the router and the network entity;

g) concatenating elements derived from the locator of the next inteimmediate neighbouring network entity with the concatenated locator;

h) repeating, for the next intermediate neighbouring network entity, steps e) to g) unless the next entity on the path is the network entity; and i) concatenating elements derived from a locator of the network entity with the concatenated locator to form a globally unique locator for the network entity.

Optionally, the information relating to intermediate network entities includes any of capabilities of the intermediate network entity, security policies used by the intermediate network entity and Quality of Service policies used by the intermediate network entity. This information can be used when applying the policy parameter.

As an option, least distance vector routing is also used in determining the path. In this case, either of steps c) and f) comprise determining the next intermediate network entity on the basis of the lowest hop count.

The policy parameter optionally requires that all intermediate network entities on the path between the network entity and the router network fulfil a predetermined criterion. Examples of such a criterion include any of Quality of Service, security policies or other policies applied at the network entity. In this way, it is ensured that each intermediate network entity on the path fulfils the required criterion.

Alternatively, the policy parameter requires that at least one network entity on the path between the network entity and the core network fulfils a predetermined criterion. Examples of such a criterion include transcoding, encryption, decryption and admission control capability. In this way, it is ensured that at least one entity on the path fulfils the required criterion.

As an option, the network entity is selected from any one of a source or destination host, and a proxy node for a non-network object. In the case that the network entity is a proxy node for a non-network object, the non-network object is optionally selected from any of a physical object that can register with a network node, a human being, a data file, a sensor, a vehicle, a communication session, an application instance, and a physical location.

Once the locator has been constructed, it is optionally sent to a correspondent host.

The method is optionally extended to reserve network resources on the path. In this case, a network service request is sent to at least one Attachment Register associated with an entity on the path between the network entity and the core network. A determination is then made to ascertain the entity can comply with the network service request. Optionally, the method further comprises reserving resources in accordance with the network service request. The network resources request is optionally for bandwidth.

According to a second aspect of the invention, there is provided an Attachment Register function for use in a communications network, the Attachment Register being associated with a network entity. The Attachment Register function comprises means for storing a locator for the network entity, information relating to further network entities neighbouring the network entity, and policy parameters relating to routing packets via the network entity and neighbouring network entities. In the case where a path is constructed to a source or destination network entity by the Attachment Registers associated with the entities on the path, the Attachment Register further comprises means for constructing or adding to a locator for the source or destination network entity attached to a network on the basis of the stored locator, information, and policy parameters.

According to a third aspect of the invention, there is provided a network node arranged for constructing a globally unique locator for a network entity attached to a network. The node comprises means for determining a path between a core network and the network entity via intermediate network entities by applying policy routing, and means for constructing the locator by concatenating elements identifying the location of the network entity, the intermediate network entities and a node in the core network, the identifying elements being obtained from Attachment Registers associated with each of the network entity, the intermediate network entities and the node in the core network. Optionally, the node further comprises a memory arranged for storing a plurality of policy parameters relating to routing.

DETAILED DESCRIPTION

The following description sets forth specific details, such as particular embodiments, procedures, techniques, etc. for purposes of explanation and not limitation. It will be appreciated by one skilled in the art that other embodiments may be employed apart from these specific details. For example, although the following description is facilitated using a non-limiting example application to mobile communication networks configured in a tree type network topology, this technology has application to any communications network application. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

The following description uses the term network entity. Non-limiting examples of a network entity include a network, a host, a terminal, an edge router and a proxy node for a non-network object.

Figure 1:
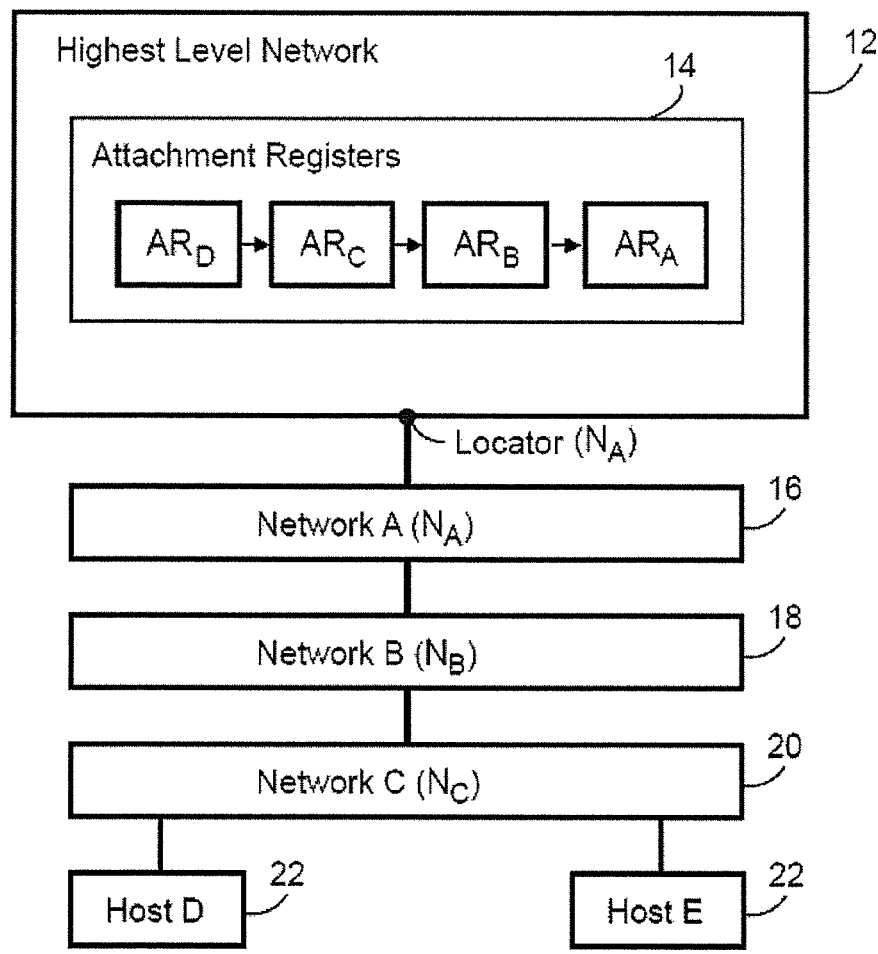
FIG. 1 is a function block diagram of an example internetwork of networks and hosts in which a set of globally-reachable attachment registers is used to perform one or more network communication functions.
Figure 2:
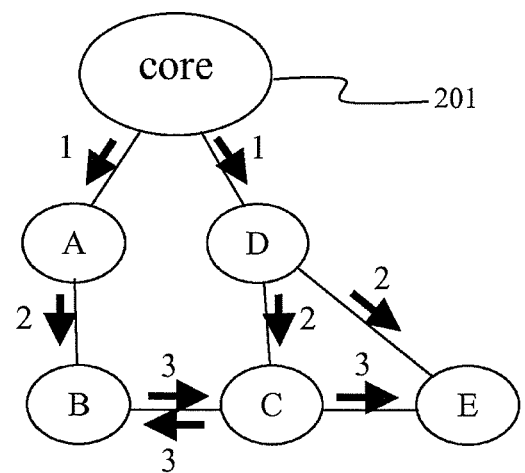
FIG. 2 illustrates schematically distance vector routing between networks and network entities according to an embodiment of the invention.

Referring to FIG. 2 herein, there is illustrated schematically distance vector routing between networks and network entities. As an illustrative example, the distance vector routing protocol announces the path length between a host E and a core network 201. Network E 201 has a path length of 3 when signalling between network E and the core network 201 traverses network C, as the signalling traverses networks C and D. However, the path length between E and the core network 201 is 2 where the signalling traverses only network D. As the signalling path via network D is shorter than that via network C, the default path between network E and the core network 201 is via network D. Using a simple analysis of distance between the source and the destination, the most efficient route between network E and the core network 201 can be ascertained.

The situation becomes more complicated when different networks support different service classes, and it is desired to send signalling using different service classes. This situation is illustrated schematically in FIG. 3. In this example, a link between adjacent networks can support one or both of the Quality of Service (QoS) service classes illustrated. Network A supports QoS class 2 and network D supports QoS class 1. In order to determine the shortest distance vector of each service class to network E, network E receives routing messages for both service classes and detects that the shortest path to the core for service class 1 is via network D (distance 2), and for service class 2 via network C (distance 3, and the path goes via network A).

Each network entity has an associated Attachment Register (AR) that stores information relating to the network entity, including a locator point of an object reachable from a core network. Attachment Registers are typically stored in the core network, although this is not necessarily the case. ARs are also used to store the identities of neighbouring networks or network entities, and policy parameters that the associated network entity applies to signalling between the network entity and its neighbours. Non-limiting examples of such policy parameters include QoS parameters, such as bandwidth on the link to the neighbour network, and traffic filter criteria for traffic to and from the neighbour network. These parameters are used when processing the distance vector routing information that is received from the ARs associated with neighbouring networks. The distance vector routing information is then updated based on the processing of the policy parameters, and forwarded to ARs associated with neighbouring network entities.

To perform end-to-end routing, the paths to the core network that are optimal from a policy point of view are found both for the source and the destination nodes. The path from the source node to the core network is encoded in the source locator stored in the associated source node AR, and the path from the core to the destination node is encoded in the destination locator stored in the associated destination node AR.

Encoding is carried out as a part of construction process of a globally unique locator for the node. A locator may be constructed by concatenating an ordered list of network names or local locators of each network entity in a path between the node and the core network. As described above the local locators are stored in the AR associated with each network entity. The ordered list of network names or local locators in addition to an address or other identifier of the core network are used to form a global locator for the node. The global identifier can be encoded into a binary string like an IP address. Each network entity in the path between the core network and the node would then have a hierarchical IP address similar to an IP subnet.

The routing protocol operates between the Attachment Registers to find the shortest construction path for a specific service class. After the source and destination locators have been constructed, end-to-end forwarding of user data packets is based on the source locator when forwarding from the source to the core network, and based on the destination locator when forwarding from the core network to the destination.

If the path from the source node towards the core network coincides with a path from the core to the destination node, this is reflected in coinciding locator elements in the source and destination locators. The source node (or any other forwarding node along the path) can detect the coinciding locator elements and construct a short-cut path from the source to the destination that does not traverse the core network. For example, assume that a source node attached to network C in FIG. 3 initiates packet communication with a destination node attached to network E along a path that fulfils the QoS class 1 criteria. The source node then constructs a source locator for itself that describes the path from the core network via networks D and C. It then constructs a locator for the destination node that describes the path from the core network via networks D and E. The source node then detects that the path from the core network to network D is a common element in both the source and the destination locators. Based on this information, the source node can construct a short-cut path from the source node via networks C, D, and E, to the destination. This short-cut path can be encoded in a locator and be used for packet forwarding.

The core network is assumed to be overdimensioned so that the QoS will be good enough regardless of the selected path. An example of such a core network is an IP backbone.

Figure 4:
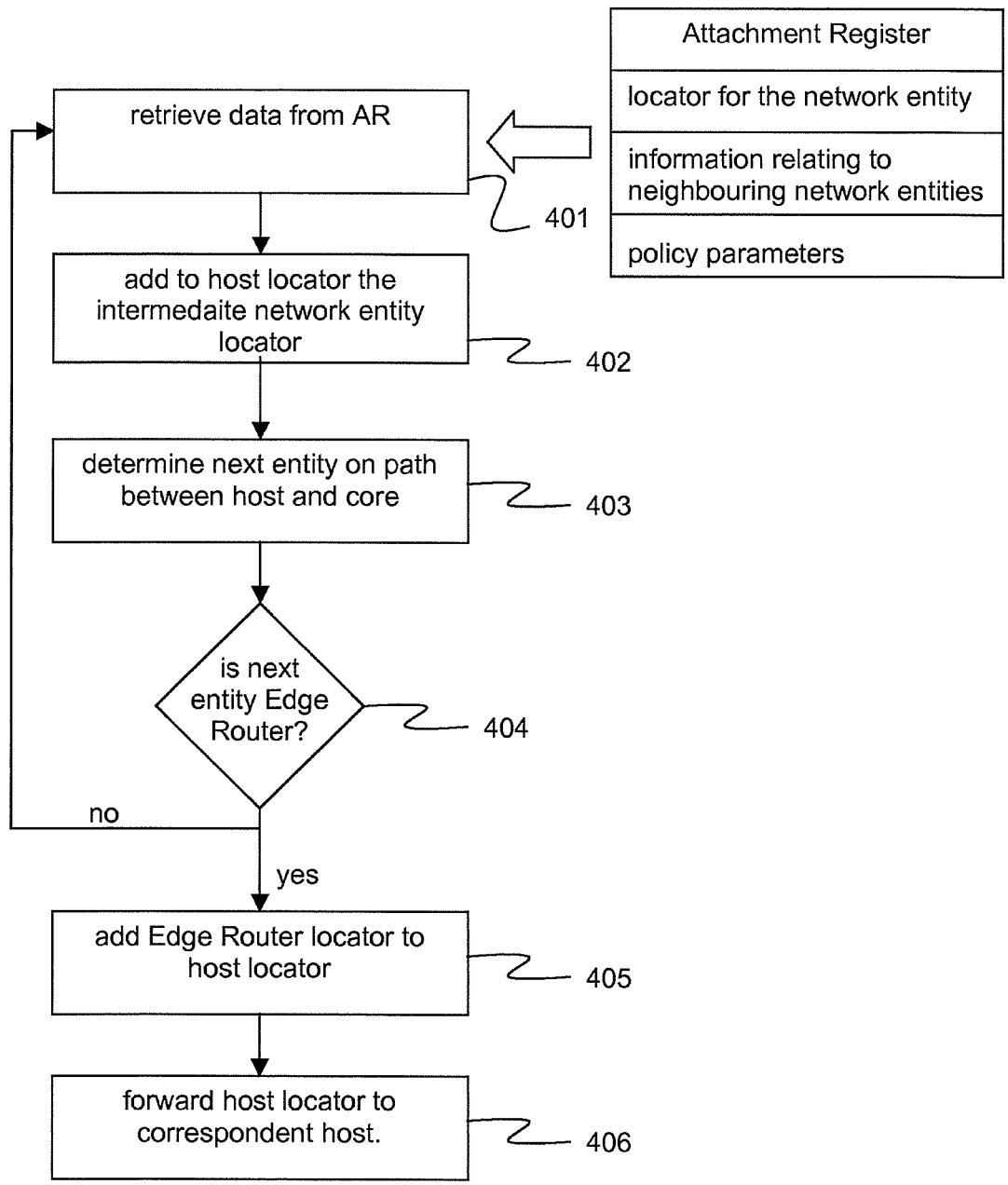
FIG. 4 is a flow diagram illustrating the basic steps of an embodiment of the invention.

The basic steps of policy routing and constructing a locator for a host attached to a network are illustrated in the flow diagram of FIG. 4. The following numbered steps refer to the numbering used in FIG. 4:

401. Data is retrieved from an AR relating to a network entity. The data includes a locator (which may be a local locator or a globally unique ID for the network entity, depending on whether the constructed locator is based on a concatenation of local locators or network IDs) for the network entity, information relating to neighbouring network entities and routing policy parameters regarding which neighbouring network entity should be on the next "hop" in a path between a host and the core network;
402. The locator for the network entity is added to a locator for the host;
403. On the basis of the routing policy parameters, and the information relating to neighbouring network entities, the next network entity in the path between the host and the core network is selected from the neighbouring networks;
404. If the selected network entity is not an Edge Router, then steps 401, 402 and 403 are repeated;
405. If the selected network entity is an Edge Router, then the locator for the Edge Router is added to the locator for the host; and
406. The locator for the host is forwarded to a correspondent host that wishes to communicate with the host.

Figure 5:
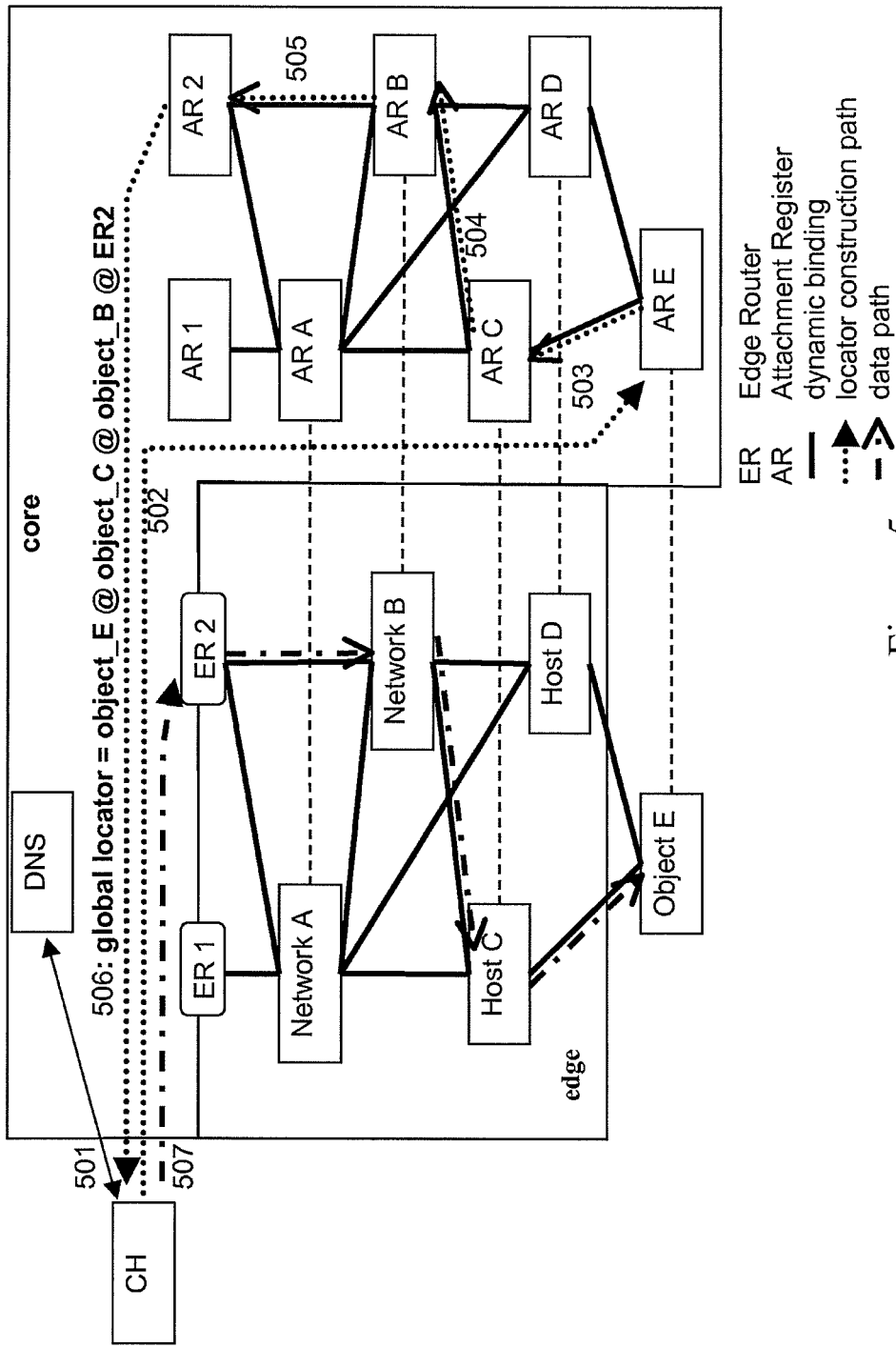
FIG. 5 illustrates schematically a policy routing mechanism among Attachment Registers according to an embodiment of the invention.

Referring to FIG. 5 herein, there is illustrated schematically an example of a policy routing mechanism among ARs. When constructing a globally unique locator for object E, the policy routing protocol is used to find a construction path to the core network that fulfils the policy criteria. The following numbered steps refer to the numbering used in FIG. 5:

501. A Correspondent Host (CH) that wishes to communicate with Object E performs a Domain Name Server lookup with a Domain Name System (DNS) Server to obtain an address for the $AR_E$, the Attachment Register associated with Object E.
502. The CH communicates with $AR_E$ to obtain an address for object E
503. $AR_E$ determines, using policy parameters and the information stored about neighbouring networks, that the next hop should be to Host C, and accordingly refers to $AR_C$ (associated with Host C) to obtain information about Host C for constructing a locator for Object E.
504. $AR_C$ determines, using policy parameters and the information stored about neighbouring networks, that the next hop should be to Network B, and accordingly refers to $AR_B$ (associated with Network B) to obtain information about Network B for constructing a locator for Object E.
505. $AR_B$ determines, using policy parameters and the information stored about neighbouring networks, that the next hop should be to Edge Router 2, and accordingly refers to $AR_2$ (associated with Edge Router 2) to obtain information about Edge Router 2 for constructing a locator for Object E.
506. Once the locator for Object E has been constructed using locator information stored in each AR on the chosen path between the core network and Object E, the constructed locator is returned to CH.
507. CH uses the constructed locator for Object E to send data packets to Object E. Since the data packets follow the path reflected by the locator construction path, the data packets follow a path that fulfils the policy criteria since the destination locator for Object E has been constructed based on these criteria.

Figure 3:
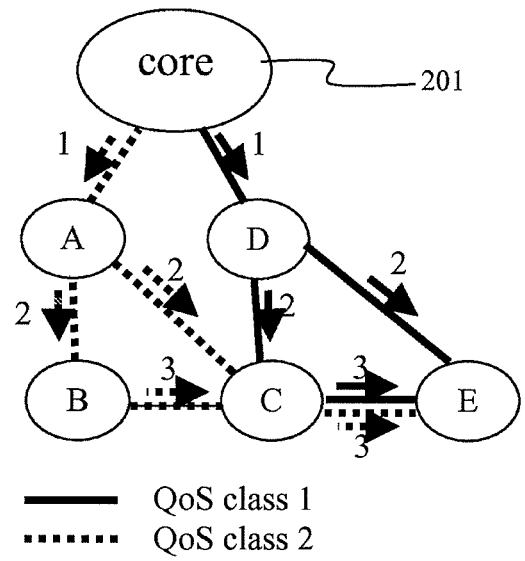
FIG. 3 illustrates schematically distance vector routing between networks and network entities according to a further embodiment of the invention in which two services classes are applied to signalling.

FIG. 3, described above, illustrates an example of finding a path between a node and the core network where all the traversed links and network entities fulfil a specific QoS class criterion. This is termed AND-routing, since each network entity must fulfil a QoS condition to be used (e.g. for QoS class 1, Network D AND Network C). However, other policy routing criteria are of interest under certain circumstances. For example, consider a case where a path should traverse at least one network that supports transcoding (i.e. converting a data signal from one codec to another). In this case there is an OR-condition of the capability parameters of the components of the path, as data packets must traverse at least one network entity that has the required capability, but it does not matter which particular network entity this is. The term OR-routing is used for this case. Other examples of cases where OR-routing can be used include the case where a path must include a node or network with the capability to encrypt or decrypt a signal, and a node with the capability to perform admission control.

Figure 6:
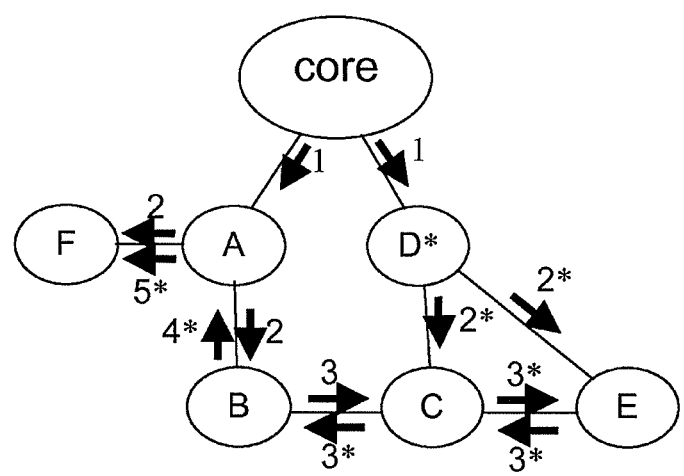
FIG. 6 illustrates schematically distance vector routing between networks and network entities according to an embodiment of the invention in which signalling must pass through a network or network entity with specific capabilities.

Distance vector routing towards a core network can support OR-routing as illustrated in FIG. 6. In this example, Network D has a special capability e.g. a coding capability, and is therefore marked with a *. Since it is sufficient to traverse just one network or network entity with this capability, OR-routing is applied here. All distance vector routing announcements from network D therefore indicate the *-capability (indicated with a * after the hop count in FIG. 6). Network F receives a hop count of 5 for the path to the core network having the *-capability (the path from the Core Network 201 being via networks D, C, B and A), and a hop count of 2 for the path where the special capability is not required (the path from the Core Network 201 being via network A).

The usage of the *-capability is optional when traversing a network having this capability. Therefore, it is only necessary to send a separate announcement for paths that do not have the *-capability when such paths have a lower hop count to the core network. For example, in FIG. 6, network E does not have a shorter path to the core than the ones that traverse the *-capable network D, and therefore only receives routing announcements that indicate this capability (from networks C and D). Since network D announces the lowest hop count, it will be the preferred next hop network when sending traffic from network E, both for traffic that require the *-capability and for regular traffic.

Figure 7:
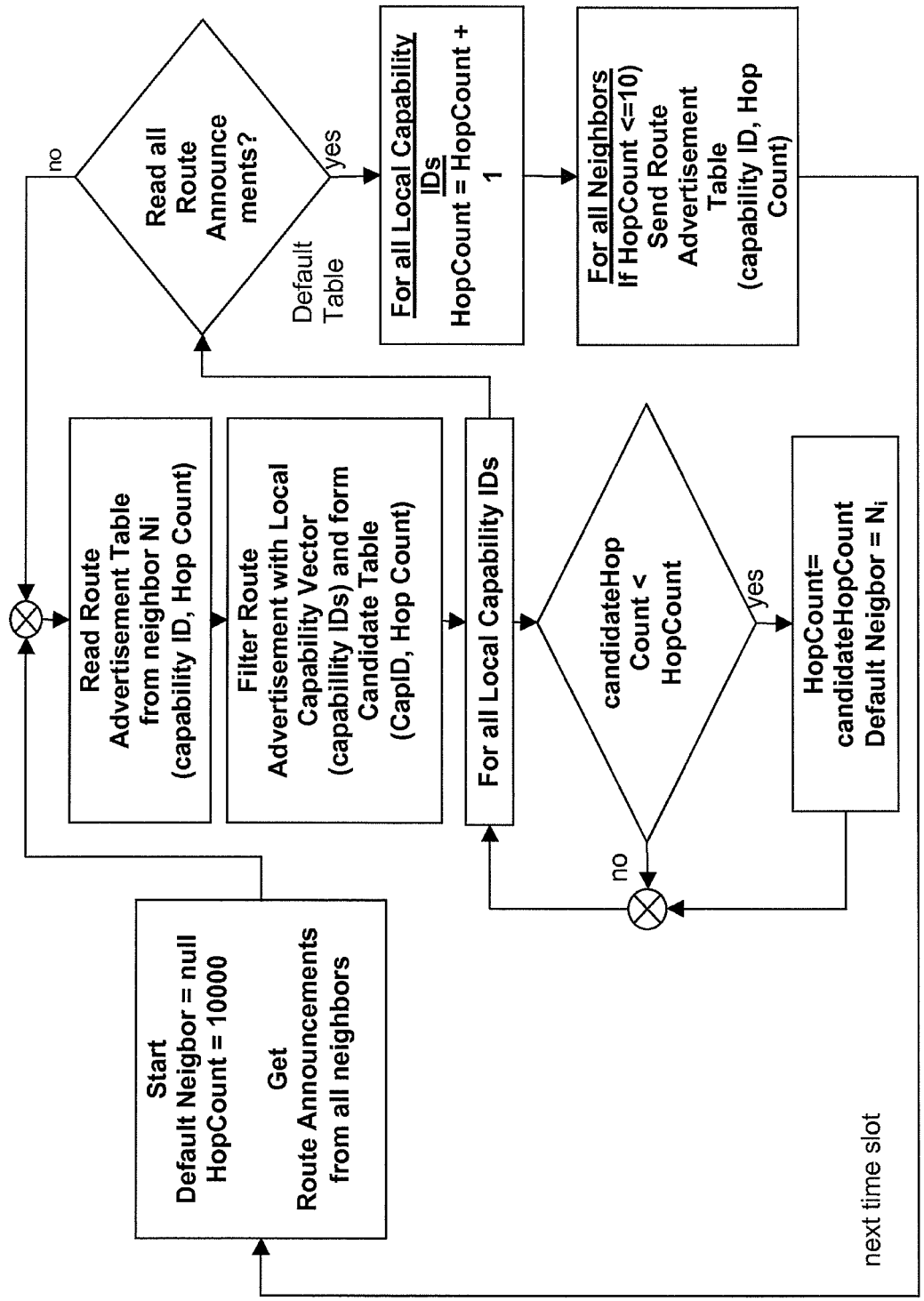
FIG. 7 is a flow chart illustrating processing of policy routing in an Attachment Register according to an embodiment of the invention.

The processing of routing information in an Attachment Register of a moving network is illustrated in the flow chart of FIG. 7. This describes a basic distance vector algorithm complemented with functions for policy routing. A centralized routing function in each network receives routing messages from all neighbour networks. These messages indicate a hop count to the core network for each capability ID. For example, a network capability such as "gold QoS" may have a specific capability ID, and "silver QoS" may have a different capability ID. The hop count to the core may be different for the different capability IDs.

The routing function of a network only processes the routing messages that have a capability ID that is supported by the network. The route processing finds the network that has advertised the lowest hop count to the core for each network capability ID, and increments the hop count by one. The neighbour network with the lowest hop count is the default network, which is defined per network capability ID, and is used as the next hop when forwarding a packet requiring a specific network capability towards the core.

The data pairs (network capability ID, default network) are stored in the default table. The pairs (network capability ID, hop count) are stored in the Advertisement Table, which is sent to all the Attachment Registers associated with neighbour networks. The routing functions of the neighbour networks then process these advertisements in the same fashion.

Figure 8:
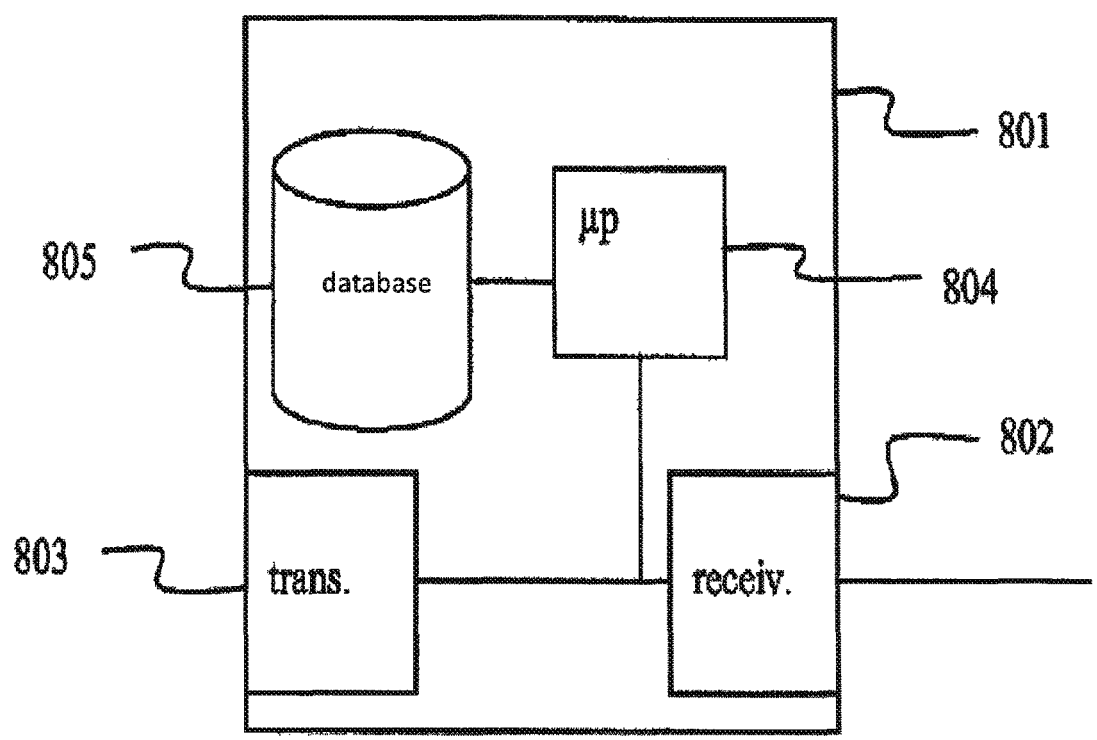
FIG. 8 illustrates schematically a network node according to an embodiment of the invention.

The routing function may be distributed across the core network, or may be a dedicated function in a node in the network, or a discrete node in the network. FIG. 8 illustrates schematically a routing function node 801. The routing function 801 comprises a receiver 802 for receiving information from an Attachment Register, and a transmitter 803 for sending information to an Attachment Register. The routing function 801 further comprises a processor 804 for constructing a globally unique locator for an object on the basis of information received from an Attachment Register. The routing function 801 may further include a database 805 that stores routing policy information to be used in addition to routing policies stored in the Attachment Registers.

As described above, a global locator is constructed by traversing a sequence of Attachment Registers (steps 503, 504 and 505 in FIG. 5). Each Attachment Register in the path is queried separately by the routing function for the data that are needed to construct a locator, including the next-hop Attachment Register defined by the policy routing protocol.

In a further embodiment of the invention, a locator construction request to the Attachment Register is combined with a network service request that the Attachment Register evaluates using a policy decision and policy enforcement mechanism. Using the policy routing mechanism, the locator construction request signalling is routed via the Attachment Registers of the networks that have the capability to fulfil the network service request specified in the locator construction request sent from the CH. The network associated with the Attachment Register is then a policy domain (see IETF RFC 3198 Terminology for Policy-Based Management). An example of such a network service request is a request for a bandwidth reservation between the host and the core network.

Figure 9:
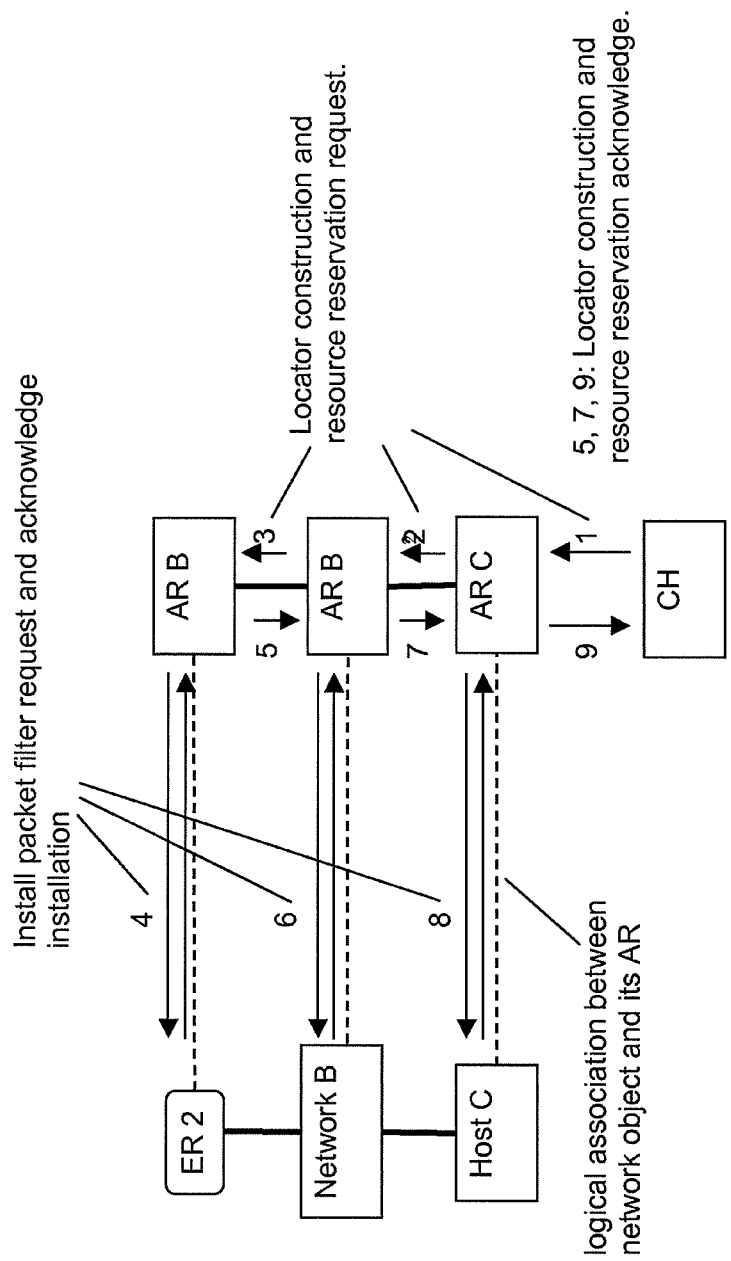
FIG. 9 illustrates schematically a resource reservation procedure and the construction of a globally unique locator for a network entity according to an embodiment of the invention.

If a bandwidth reservation is accepted by all traversed Attachment Registers, then each Attachment Register requests the installation of a packet filter in the routers of its associated network. This packet filter admits a packet flow with the header fields and bandwidth parameters described by the bandwidth reservation request, as illustrated in FIG. 9.

The bandwidth reservation is complete for a path between a destination or source host and the core network when the packet filters for the packet flow of the resource reservation have been installed in all networks, and in the Edge Router, along the path from the host to the core network.

To perform a policy decision on a request for bandwidth reservation, the Attachment Register performs a bandwidth broker function on behalf of its associated network. This includes keeping a record of the bandwidth resources on the links of the network, and also keeping a record of already reserved resources, and available resources.

Using prior art techniques, policy routing in arbitrary dynamic topologies is a complex task. However, by finding the path to the core for a source and for a destination separately, using a distance vector policy routing protocol among Attachment Registers, this task is greatly simplified. Furthermore, the usage of OR-routing enables more general policy routing schemes than the traditional AND-routing. In addition, policy decisions for network service requests, such as bandwidth reservations, can be combined with the policy routing and locator construction procedure. This combination allows for a common set of network nodes as well as a common set of signalling messages for locator construction, policy routing, and policy decision functions. As a result, both the total complexity and the total amount of bandwidth required for locator construction and policy-related signalling is reduced.

In a further embodiment of the invention, the globally unique locator that is constructed using the routing policy is not limited to providing a location to a host, but may provide a location for other objects such as passive components, human beings, data files and so on. It is quite common that mobile objects travel within or in association with other mobile objects. For example, a person may travel in association with a mobile telephone and a laptop computer that may be associated with a personal area network that may in turn be associated with a vehicular network (e.g. on a train). A globally unique locator may be provided for the person in addition to the mobile telephone and the laptop. In this case, the person can be contacted directly using either their laptop or their mobile telephone according to their preference.

Any object can be traceable if it has a globally unique locator. Examples of such objects include the following:
    a network such as a PAN or VAN;
    a host or terminal;
    a physical object that can register with a network node using e.g. an RFID tag, a PIN code or a bar code;
    a human being;
    a data file;
    a sensor;
    a vehicle;
    a communication session such as a telephone call;
    an application instance; or
    a physical location such as a hotel room or a conference room.

Such objects need not have network interfaces of their own. In this case they cannot initiate a registration with an Attachment Register, so a network entity must act as a proxy for the object. For example, a human being may "attach" to a network using a mobile telephone as a proxy.

Although various embodiments have been shown and described in detail, the claims are not limited to any particular embodiment or example. None of the above description should be read as implying that any particular element, step, range, or function is essential such that it must be included in the claims' scope. The scope of patented subject matter is defined by the claims.

The invention claimed is:

1. A method of constructing a globally unique locator for a network entity attached to a network, the method comprising:
    determining a path between a core network and the network entity via intermediate network entities by applying policy routing; and
    constructing the globally unique locator for the network entity, wherein
    1) the constructing step comprises:
        a1) obtaining a locator of the network entity;

b1) retrieving, from an Attachment Register associated with the network entity, information relating to intermediate network entities neighbouring the network entity, the information including locators for the neighbouring intermediate network entities;

c1) determining, on the basis of the retrieved information and policy parameters retrieved from one of the Attachment Register and a central database, the neighbouring intermediate network entity next on a path between the network entity and the core network;

d1) concatenating elements derived from the locator for the network entity with elements derived from the determined intermediate network entity to form a concatenated locator;

e1) retrieving, from an Attachment Register associated with the determined intermediate network entity, information relating to further intermediate network entities neighbouring the determined intermediate network entity, the information including locators for the intermediate network entities neighbouring the determined intermediate network entity;

f1) determining, on the basis of the retrieved information and policy parameters retrieved from one of the Attachment Register associated with the determined intermediate network entity and a central database, the neighbouring intermediate network entity next on a path between the network entity and a core network;

g1) concatenating elements derived from the locator of the next intermediate neighbouring network entity with the concatenated locator;

h1) repeating, for the next intermediate neighbouring network entity, steps e1) to g1) unless the next network entity is a router disposed at the core network; and i1) concatenating elements derived from a locator of the router with the concatenated locator to form the globally unique locator for the network entity, or 2) the constructing step comprises:

a2) obtaining a locator of a router disposed at the core network;

b2) retrieving, from an Attachment Register associated with the router, information relating to intermediate network entities neighbouring the router, the information including locators for the neighbouring intermediate network entities;

c2) determining, on the basis of the retrieved information and policy parameters retrieved from one of the Attachment Register and a central database, the neighbouring intermediate network entity next on a path between the router and the network entity;

d2) concatenating elements derived from the locator for the router with elements derived from the determined intermediate network entity to form a concatenated locator;

e2) retrieving, from an Attachment Register associated with the determined intermediate network entity, information relating to further intermediate network entities neighbouring the determined intermediate network entity, the information including locators for the intermediate network entities neighbouring the determined intermediate network entity;

f2) determining, on the basis of the retrieved information and policy parameters retrieved from one of the Attachment Register associated with the determined intermediate network entity and a central database, the neighbouring intermediate network entity next on a path between the router and the network entity;

g2) concatenating elements derived from the locator of the next intermediate neighbouring network entity with the concatenated locator;

h2) repeating, for the next intermediate neighbouring network entity, steps e2) to g2) unless the next entity on the path is the network entity; and i2) concatenating elements derived from a locator of the network entity with the concatenated locator to form the globally unique locator for the network entity.

2. The method according to claim 1, further comprising:

a) obtaining the locator of the network entity;

b) retrieving, from the Attachment Register associated with the network entity, the information relating to the intermediate network entities neighbouring the network entity, the information including the locators for the neighbouring intermediate network entities;

c) determining, on the basis of the retrieved information and the policy parameters retrieved from one of the Attachment Register and the central database, the neighbouring intermediate network entity next on the path between the network entity and the core network;

d) concatenating the elements derived from the locator for the network entity with the elements derived from the determined intermediate network entity to form the concatenated locator;

e) retrieving, from the Attachment Register associated with the determined intermediate network entity, the information relating to the further intermediate network entities neighbouring the determined intermediate network entity, the information including the locators for the intermediate network entities neighbouring the determined intermediate network entity;

f) determining, on the basis of the retrieved information and the policy parameters retrieved from one of the Attachment Register associated with the determined intermediate network entity and the central database, the neighbouring intermediate network entity next on the path between the network entity and the core network;

g) concatenating the elements derived from the locator of the next intermediate neighbouring network entity with the concatenated locator;

h) repeating, for the next intermediate neighbouring network entity, steps e) to g) unless the next network entity is the router disposed at the core network; and i) concatenating elements derived from the locator of the router with the concatenated locator to form the globally unique locator for the network entity.

3. The method according to claim 2, wherein the information relating to intermediate network entities includes any of capabilities of an intermediate network entity, security policies used by the intermediate network entity and Quality of Service policies used by the intermediate network entity.

4. The method according to claim 2, wherein any of steps c) and f) comprise determining the next intermediate network entity on the basis of the lowest hop count.

5. The method according to claim 2, wherein a retrieved policy parameter requires that all intermediate network entities on the path between the network entity and the router fulfill a predetermined criterion.

6. The method according to claim 5, wherein the predetermined criterion includes any of Quality of Service, security policies or other policies applied at the network entity.

7. The method according to claim 1, further comprising:

a) obtaining the locator of the router disposed at the core network;

b) retrieving, from the Attachment Register associated with the router, the information relating to the intermediate network entities neighbouring the router, the information including the locators for the neighbouring intermediate network entities;
c) determining, on the basis of the retrieved information and the policy parameters retrieved from one of the Attachment Register and the central database, the neighbouring intermediate network entity next on the path between the router and the network entity;
d) concatenating the elements derived from the locator for the router with the elements derived from the determined intermediate network entity to form the concatenated locator;
e) retrieving, from the Attachment Register associated with the determined intermediate network entity, the information relating to the further intermediate network entities neighbouring the determined intermediate network entity, the information including the locators for the intermediate network entities neighbouring the determined intermediate network entity;
f) determining, on the basis of the retrieved information and the policy parameters retrieved from one of the Attachment Register associated with the determined intermediate network entity and the central database, the neighbouring intermediate network entity next on the path between the router and the network entity;
g) concatenating the elements derived from the locator of the next intermediate neighbouring network entity with the concatenated locator;
h) repeating, for the next intermediate neighbouring network entity, steps e) to g) unless the next entity on the path is the network entity; and
i) concatenating elements derived from the locator of the network entity with the concatenated locator to form the globally unique locator for the network entity.

8. The method according to claim 1, wherein a retrieved policy parameter requires that at least one network entity on the path between the network entity and the core network fulfills a predetermined criterion.

9. The method according to claim 8, wherein the predetermined criterion is selected from any of transcoding, encryption, decryption and admission control capability.

10. The method according to claim 1, wherein the network entity is selected from any one of a source or destination host, and a proxy node for a non-network object.

11. The method according to claim 10, wherein the non-network object is selected from any of a physical object that can register with a network node, a human being, a data file, a sensor, a vehicle, a communication session, an application instance, and a physical location.

12. The method according to claim 1, further comprising forwarding the constructed locator for the network entity to a correspondent host.

13. The method according to claim 1, further comprising:
sending a network service request to at least one Attachment Register associated with an entity on the path between the network entity and the core network; and
determining whether the entity can comply with the network service request.

14. The method according to claim 13, further comprising:
at the entity, reserving resources in accordance with the network service request.

15. The method according to claim 14, wherein the network service request is for bandwidth.

16. The method of claim 1 wherein concatenating elements identifying the location of the network entity, the intermediate network entities and a node in the core network comprises forming a new element by linking end-to-end an element identifying the location of the network entity and an element identifying an intermediate network entity.

17. The method of claim 16, wherein concatenating elements identifying the location of the network entity, the intermediate network entities and a node in the core network further comprises linking end-to-end the new element and an element identifying a node in the core network.

18. The method of claim 1 wherein concatenating elements identifying the location of the network entity, the intermediate network entities and a node in the core network comprises forming a new element by linking end-to-end an element identifying the location of the network entity and an element identifying a node in the core network.

19. A network node arranged for constructing a globally unique locator for a network entity attached to a network, the node comprising a processor and a memory and being configured to:
determine a path between a core network and the network entity via intermediate network entities by applying policy routing; and
constructing the locator, wherein
1) the node is configured to construct the locator by:
a1) obtaining a locator of the network entity;
b1) retrieving, from an Attachment Register associated with the network entity, information relating to intermediate network entities neighbouring the network entity, the information including locators for the neighbouring intermediate network entities;
c1) determining, on the basis of the retrieved information and policy parameters retrieved from one of the Attachment Register and a central database, the neighbouring intermediate network entity next on a path between the network entity and the core network;
d1) concatenating elements derived from the locator for the network entity with elements derived from the determined intermediate network entity to form a concatenated locator;
e1) retrieving, from an Attachment Register associated with the determined intermediate network entity, information relating to further intermediate network entities neighbouring the determined intermediate network entity, the information including locators for the intermediate network entities neighbouring the determined intermediate network entity;
f1) determining, on the basis of the retrieved information and policy parameters retrieved from one of the Attachment Register associated with the determined intermediate network entity and a central database, the neighbouring intermediate network entity next on a path between the network entity and a core network;
g1) concatenating elements derived from the locator of the next intermediate neighbouring network entity with the concatenated locator;
h1) repeating, for the next intermediate network entity, steps e1) to g1) unless the next network entity is a router disposed at the core network; and
i1) concatenating elements derived from a locator of the router with the concatenated locator to form the globally unique locator for the network entity, or
2) the node is configured to construct the locator by:
a2) obtaining a locator of a router disposed at the core network;
b2) retrieving, from an Attachment Register associated with the router, information relating to intermediate network entities neighbouring the router, the information including locators for the neighbouring intermediate network entities;

c2) determining, on the basis of the retrieved information and policy parameters retrieved from one of the Attachment Register and a central database, the neighbouring intermediate network entity next on a path between the router and the network entity;

d2) concatenating elements derived from the locator for the router with elements derived from the determined intermediate network entity to form a concatenated locator;

e2) retrieving, from an Attachment Register associated with the determined intermediate network entity, information relating to further intermediate network entities neighbouring the determined intermediate network entity, the information including locators for the intermediate network entities neighbouring the determined intermediate network entity;

f2) determining, on the basis of the retrieved information and policy parameters retrieved from one of the Attachment Register associated with the determined intermediate network entity and a central database, the neighbouring intermediate network entity next on a path between the router and the network entity;

g2) concatenating elements derived from the locator of the next intermediate neighbouring network entity with the concatenated locator;

h2) repeating, for the next intermediate neighbouring network entity, steps e2) to g2) unless the next entity on the path is the network entity; and i2) concatenating elements derived from a locator of the network entity with the concatenated locator to form the globally unique locator for the network entity.

20. The network node according to claim 19, further comprising a memory, the memory arranged for storing a plurality of policy parameters relating to routing.

\* \* \* \* \*